Figure 1:
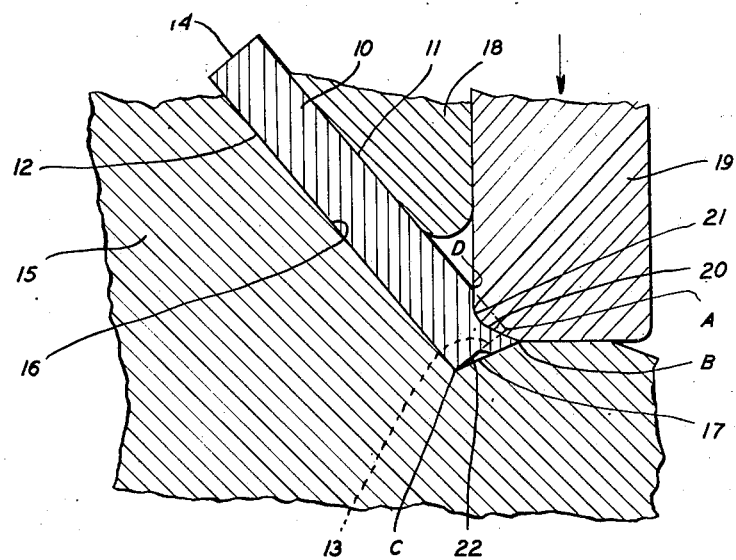

April 12, 1949.   J. O. FORSTER ET AL   2,467,302
METHOD OF MAKING EDGED TOOL BLADES
Filed June 21, 1947

INVENTOR.
JOHN O. FORSTER
EUGENE M. LANG
BY *Walter S. Bleston*

ATTORNEY.

Patented Apr. 12, 1949

2,467,302

UNITED STATES PATENT OFFICE 2,467,302

METHOD OF MAKING EDGED TOOL BLADES

John O. Forster, Long Island City, and Eugene M. Lang, Jamaica, N. Y., assignors to Heli-Coil Corporation, a corporation of New York Application June 21, 1947, Serial No. 756,142

3 Claims. (Cl. 76—101)

1

The invention relates to a method of providing a tool blade with an undercut edge of more or less acute sharpness, as required in certain tools used for cutting or gripping. It is customary to produce a tool for the indicated purpose by first making a blade of the desired contour from a stock material having the required thickness and, then, providing the undecut by a grinding or other material-removing process. Such method has the disadvantage that it is usually rather slow and that the edge-forming portion is reduced in strength. This is due to the fact that on the one hand the edge contains less material in cross-section than the blade body, and that on the other hand, the laminary structure of the material in the edge is interrupted owing to the customary manner in which the material-removing tool is operated.

The present invention aims to avoid or at least reduce such disadvantages and to provide a blade with an undercut edge of increased strength. The invention essentially consists in that the edge is produced by a shaping operation under high pressure whereby the structure of the edge-forming material is rendered denser than the structure of material of the blade body and no interruption of the laminary structure takes place.

Further objects and details of the invention will be hereinafter described with reference to the appended drawing illustrating its application by way of example.

Figure 2:
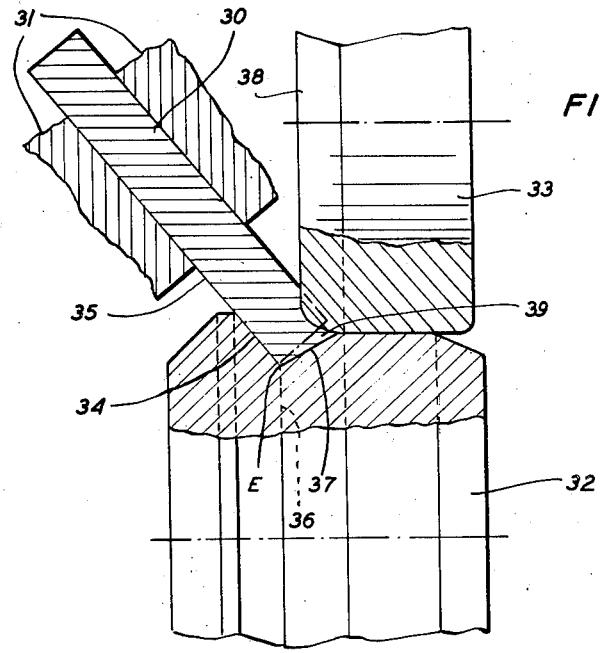

In the drawing,

Fig. 1 is a diagrammatical cross-section of a blade and suitable tools applied thereto to produce the undercut edge according to the invention; and Fig. 2 is a cross-section of a similar blade with another kind of tools applied thereto for the same purpose.

The blade to be provided with the undercut edge is preferably made of a flat stock material in the form of strips or plates of required thickness. Blanks are cut from such material in the desired shape by any suitable and conventional operation, for instance by stamping. The cross-section visible in Fig. 1 of the blank so obtained will be substantially a rectangle having two parallel sides 11 and 12 according to the top and bottom surfaces, respectively, and another pair of parallel sides 13 and 14 of a length according to the thickness of the blade material. The corner A, where in the illustrated example the undercut edge is to be produced, is included in the blank by the sides 11 and 13 as shown in dot and dash lines, whereas the finished edge shown in solid lines is located at

2 the point B. In order to produce such edge the blank is held in a slanting position and supported at the lower corner C opposite that where the edge is to be formed. This may be done by a die 15 having a slanting face 16 adjacent which there is an oppositely slanting face 17; the two faces include an angle of more than 90 degrees, according to the bottom angle desired for the edge. A hold down member 18 may be used to bear on the side 11 of the blade so however that the lower portion is free for the application of an edge-forming tool such as e. g. the punch 19. This tool is movable at an acute angle in relation to the top face 11 of the blade. In the illustrated arrangement where the blade is shown in an inclined position, the punch is operative in a vertical path. However, other suitable arrangements are conceivable, where the punch may be moved in a slanting direction while the blade blank is in a vertical or horizontal position, or where the punch is moved in a slanting direction and the blade blank is held at an angle thereto and also aslant. The punch has an active face 20 so inclined as to produce the desired top angle of the edge to be formed. If the blade blank is inserted between die 15 and hold down member 18 and, then, the punch 19 forced down, the latter will first contact the face 11 at or close to the point D, i. e. at a distance from point A, where the undercut 21 is intended to start; the corner A will be bent downwards to the point B and the edge will form as shown in the drawing. Simultaneously, the edge-forming material will be highly compressed and condensed. It will be noticed that there is, in the example of Fig. 1, an indentation 22 on the bottom side of the edge. Whether such indentation forms depends on the shape of the coacting die and punch, in other words if the material originally filling the undercut is sufficient in its compressed state to fill the hollow space between the die face 17 and the side 13 of the blank, no such indentation will occur. Whether such indentation is desirable will depend on the use to which the blade is put. In forming the undercut edge, the direction in which the compressing force is applied in relation to the plane of the top face of the blank may be selected according to circumstances. In any event, however, that direction should have a component of considerable magnitude in the direction of the side 11 of the blank towards the corner A. Thereby it can be avoided that material bulges up on the side of point D opposite the corner A; and it can be attained that practically all the material from the portion between the points D and A is condensed into the edge-forming portion of the finished blade.

It will be clear that by the method described, edges of any desired length may be produced, provided dies of adequate dimensions are used. An edge produced by the method according to the invention has a remarkable strength. We have found that such an edge is capable of withstanding much greater loads than gripping or cutting edges produced in the conventional manner, and that in a number of tests edges produced by the new method did not show any wear whereas conventionally produced edges under similar stresses got notchy or dented. The new method is also advantageous for the reason that it allows for a very rapid production, as a blade blank may be stamped from stock material and the edge may be made in one coining operation by a punch hitting the blank in one rapid stroke.

Although the method just described is the preferred one, modifications are possible to obtain similar results. One such modification is illustrated in Fig. 2 where the edge is obtained by rolling rather than by coining. In this case, the blank 30 is held in a holder 31 and guided thereby with its lower end between two oppositely rotating forming rollers 32 and 33. Roller 32 has one conical face 34 of an inclination according to the slanting position of the blank which bears against that face with its lower side 35. The blank corner E is supported at the bottom 36 of the roller groove which is constituted by said face 34 and an oppositely conical face 37 which is inclined according to the desired bottom angle of the edge. The upper roller has a face portion 38 according to the shape of the desired undercut of the finished edge 39. By passing the blank in the illustrated position between the pressure rolls, an edge can be produced which has properties similar to those hereinbefore described, as the edge-forming material is condensed and compressed in a direction subtantially aslant with respect to the plane of the blade.

We claim:

1. A method of producing a tool blade with an undercut, gripping or cutting, edge, which comprises the steps of making a blade blank of a flat material of the desired thickness of the blade body and of a substantially rectangular cross-section, holding said blank with that corner exposed of which it is intended to form said edge and which is included by one flat face and an adjacent end face of said blank, hitting a zone of said flat face parallel to said corner with a punch formed according to the shape of the desired undercut, the hitting stroke being directed at a slant with respect to the plane of said flat face and with a component towards said corner, thereby urging said corner from its original position against a supporting surface at an acute angle with respect to the original planes of said corner faces.

2. A method of producing a tool blade with an undercut, gripping or cutting edge comprising the steps of making a blade blank of a flat material of the desired thickness of the blade body having an end face forming corners with the upper and the lower surfaces, respectively, of said blank, so holding said blank with the lower one of said corners in a V-shaped groove of a supporting member the flanks of which groove include an angle larger than that of said corner, that the lower blank surface is supported by one of said flanks while the end face of the blank is angularly spaced from the other flank, and applying pressure to the upper surface of the blank so held in a zone parallel and adjacent to the upper one of said corners, said pressure being so directed at a slant with respect to the upper blank surface as to have a major component in the plane of said upper surface and towards said upper corner, thereby urging said corner from its original position against said other groove flank, so as to simultaneously indent said zone to shape the desired edge and undercut and condensing the edge-forming material.

3. A method of producing a tool blade with an undercut, gripping or cutting edge comprising the steps of making a blade blank of a flat material of the desired thickness of the blade body having an end face forming corners with the upper and the lower surfaces, respectively, of said blank, so holding said blank with the lower one of said corners in a V-shaped groove of a supporting roller the flanks of which groove include an angle larger than that of said corner, that the lower blank surface is supported by one of said flanks while the end face of the blank is angularly spaced from the other flank, applying pressure to the upper surface of the blank so held in a zone parallel and adjacent to the upper one of said corners by another roller rotatable about an axis parallel to that of the supporting roller and being shaped according to the desired undercut, and moving the blank so held in a direction parallel to said corner, thereby urging said corner from its original position against said other groove flank of said supporting member.

JOHN O. FORSTER.
EUGENE M. LANG.

REFERENCES CITED

The following references are of record in the file of this patent:

UNITED STATES PATENTS

| Number | Name | Date |
|---|---|---|
| 180,915 | Pedder et al. | Aug. 8, 1876 |
| 435,573 | Tyler | Sept. 2, 1890 |
| 806,244 | Depew | Dec. 5, 1905 |
| 833,969 | Lower | Oct. 23, 1906 |
| 911,507 | Lier | Feb. 2, 1909 |
| 950,900 | Dow | Mar. 1, 1910 |
| 979,831 | Depew | Dec. 27, 1910 |
| 1,080,079 | Sennett | Dec. 2, 1913 |
| 1,183,474 | MacQuown et al. | May 16, 1916 |
| 1,268,365 | La Vercombe | June 4, 1918 |
| 1,542,892 | Koenig | June 23, 1925 |

FOREIGN PATENTS

| Number | Country | Date |
|---|---|---|
| 395,919 | Great Britain | July 27, 1933 |